United States Patent [19]

Dalby et al.

[11] Patent Number: 4,960,525
[45] Date of Patent: Oct. 2, 1990

[54] HYDROCYCLONE FOR WASHING PARTICLES IN LIQUID SUSPENSION

[75] Inventors: Glenn R. Dalby, Wilmington, Del.; Wolfgang K. Heiland, Trevose, Pa.

[73] Assignee: The United States of America, as represented by the Secretary of Agriculture, Washington, D.C.

[21] Appl. No.: 248,743

[22] Filed: Sep. 26, 1988

[51] Int. Cl.$^5$ .......................... B01D 21/26; B01D 9/04
[52] U.S. Cl. ................................... 210/788; 55/459.1; 62/532; 209/211; 210/512.1; 210/512.2
[58] Field of Search ............................. 209/144, 211; 210/512.1, 512.2, 711, 712, 729, 787, 788, 512.3; 127/24, 67, 68; 55/459.2, 459.4, 204, 459.1; 159/27.2

[56] References Cited

U.S. PATENT DOCUMENTS

| | | | |
|---|---|---|---|
| 2,829,771 | 4/1958 | Dahlstrom | 209/211 |
| 2,840,524 | 6/1958 | Stavenger et al. | 210/512.2 |
| 2,967,618 | 1/1961 | Vane | 209/211 |
| 3,292,386 | 12/1966 | Johnson et al. | 62/532 |
| 3,327,456 | 6/1967 | Guber et al. | 210/512.1 |
| 3,347,372 | 10/1967 | Bouchillon | 209/211 |
| 4,067,814 | 1/1978 | Surakka et al. | 55/459.4 |
| 4,090,956 | 5/1978 | Benzon | 209/211 |
| 4,270,975 | 6/1981 | Bennett | 159/27.2 |
| 4,283,232 | 8/1981 | Best | 209/211 |
| 4,297,111 | 10/1981 | Ross | 210/788 |
| 4,372,766 | 2/1983 | Andrepont | 62/532 |
| 4,453,960 | 6/1984 | Andrepont | 209/211 |
| 4,464,264 | 8/1984 | Carroll | 210/512.1 |
| 4,652,363 | 3/1987 | Miller | 210/512.1 |
| 4,666,484 | 5/1987 | Shah et al. | 62/532 |
| 4,676,809 | 6/1987 | Fjallstrom et al. | 210/512.2 |
| 4,696,737 | 9/1987 | Bouchillon | 209/210 |
| 4,755,295 | 7/1988 | Donhauser et al. | 209/144 |
| 4,855,066 | 8/1989 | Petty et al. | 210/512.2 |

*Primary Examiner*—Frank Spear
*Assistant Examiner*—Joseph Drodge
*Attorney, Agent, or Firm*—M. Howard Silverstein; John D. Fado; Curtis P. Ribando

[57] ABSTRACT

An apparatus and method for separating particulate solids from a liquid suspension relies upon a hydrocyclone having two radially and vertically spaced inlets in the upper portion thereof for establishing throughout the hydrocyclone concentric flow patterns of a fluid stream containing the particulate solids and a stream of wash fluid which are separately fed into the hydrocyclone through the inlets. The particles are efficiently separated and washed by passing laterally from one stream to the other as a result of inherent centrifugal or centripedal forces. Multiple hydrocyclone units arranged in a countercurrent series achieve a high product recovery per unit ratio. The invention is particularly suitable for freeze concentration of high value food products.

10 Claims, 4 Drawing Sheets ticles as small as 10 microns, whereas the wash column typically requires an average particle size of over 300 microns to function.

HYDROCYCLONE FOR WASHING PARTICLES IN LIQUID SUSPENSION

BACKGROUND OF THE INVENTION

1. Field of the Invention

The performance of a crystallization-based separation process is typically limited by the step where the crystalline phase is physically separated from the liquid phase. Since the methods for accomplishing this solid/liquid separation are usually very strongly dependent on the form of the crystals themselves, the approach most often taken to improve this operation is to modify the crystallization process so that it produces suitable crystals. As a result, elaborate and expensive crystallizers are often designed in order to accommodate the crystal size and shape requirements of the solid/liquid separation equipment. Moreover, in the freeze-concentration of food materials, the choice of separation methods is necessarily restricted by special considerations relating to product quality and cost. For example, fruit juices contain volatile flavor components that are retained in the freezing process. The subsequent separation stage should also retain the volatile components in order to preserve the fresh qualities of the freeze-concentrated juice. Because of the high value of food products, product losses are a particularly important consideration in freeze-concentration. This invention relates to an apparatus and process for washing and separating particles from liquid suspensions so as to maximize product recovery and quality and to minimize capital expenditures.

2. Description of the Prior Art

The currently favored separation method for use in freeze-concentration processes is the displacement wash column. In this device, the ice crystals from the freezer are compacted into a porous bed in a cylindrical column. This is done by removing the liquid concentrate through a strainer, leaving behind the amount of liquid that fills the pores of the crystal bed. The crystal bed is then transported through the column by means of a piston or screw device to the far end, where it is melted by a heating element and the resulting liquid is drawn off. Enough back pressure is maintained at this outlet so that some of the melted water is forced back into the column. The ice crystal bed is thus washed as it is displaced from the concentrated liquid portion of the column to the dilute liquid in the other end.

Under normal conditions, this apparatus meets the above-mentioned requirements for maintaining product quality. The recovery is also very high when the ice crystals from the freezer are large enough to make a sufficiently porous bed. In practice, however, food components such as sugars and pectins inhibit suitable ice crystal growth, resulting in a bed having low permeability. If the permeability becomes too low, the wash front between the dilute and concentrated regions of the column becomes unstable and the device ceases to produce any separation at all. Also, when the food material is concentrated to higher levels, not only is the concentration of crystal growth inhibitors higher but the permeability of the bed to the higher viscosity material is diminished. The net effect of these two problems is reduced wash column effectiveness. Multistage wash columns require a crystallizer for each stage, thereby adding considerably to the capital expense.

An alternative to the wash column is the hydrocyclone. Hydrocyclones can be effectively used with par- As with the wash column, the hydrocyclone is closed to the atmosphere during operation, which prevents devolatilization of flavor components. The hydrocyclone also has the advantage that it can be used to separate ice crystals from a concentrate that contains suspended solids (i.e., juice pulp), thereby avoiding a preliminary pulp removal step.

For use in solids washing and decantation, multiple hydrocyclones are used in a countercurrent arrangement. In a countercurrent cascade of conventional, "single inlet" hydrocyclones, the particle slurry and wash fluid are thoroughly mixed before they enter each cyclone. The effluent from the top and bottom outlets from each cyclone are then used to supply the wash for the preceding stage and the slurry for the following stage. The recovery that can be obtained with a properly designed system of this sort is limited only by the number of washing stages that are employed. While recovery is theoretically unlimited, a countercurrent system of conventional hydrocyclones would require an excessive number of stages to meet the stringent recovery specifications of a food concentration process.

SUMMARY OF THE INVENTION

We have now discovered an improved apparatus and method for separating either buoyant or nonbouyant particulate solids from a liquid suspension and for washing the solids to remove impurities. The impurities may be either soluble material dissolved in the liquid or other suspended particles. The novel apparatus for use in the method of the invention comprises a hydrocyclone having two tangential, radially-spaced inlets adapted to introduce the unwashed suspension and the wash fluid into the cyclone body in concentric flow patterns.

This flow pattern is accompanied by a radial pressure gradient that causes suspended solids with specific gravity less than the fluid medium (hereafter referred to as the buoyant particles) to be displaced toward the axis of the cyclone body and thus removed predominantly through the vortex finder and top outlet. Similarly, suspended solids with specific gravity greater than the fluid medium (hereafter referred to as the nonbuoyant particles) will be displaced radially toward the periphery of the cyclone body and are removed primarily through the bottom outlet at the apex of the cyclone.

The special advantage of the device for particle washing arises from the fact that the displacement of particles radially within the cyclone body occurs while the fluids entering through the two inlets remain, to a large degree, unmixed. Due to the proximity of the inner inlet to the vortex finder, a substantial portion of the fluid entering through this inlet will "short circuit" directly to the top outlet without mixing with fluid from the outer inlet. To achieve a greater degree of washing than can be obtained with one pass through the device, a countercurrent arrangement of multiple units is contemplated within the scope of the invention.

In accordance with this discovery, it is an object of this invention to provide an alternative to the commonly used separation methods (filtration, centrifugation, etc.) that is less sensitive to the form of the crystalline product and thus allows for simplification of the crystallization stage.

It is also an object of the invention to provide a separation apparatus that can alternatively be used for separating either buoyant or nonbuoyant particles from liquid suspension.

Another object of this invention is to provide a hydrocyclone characterized by increased separation and washing efficiency over conventional hydrocyclones.

A further object of this invention is to provide a multistage separation and washing operation that employs a fewer number of hydrocyclone stages for a given recovery level than an operation employing conventional hydrocyclone units.

A specific object of the invention is to provide an economical system for separating ice crystals from high-value food products being concentrated by ice crystallization.

Other objects and advantages of the present invention will become readily apparent from the ensuing description.

DETAILED DESCRIPTION OF THE INVENTION

Figure 1:
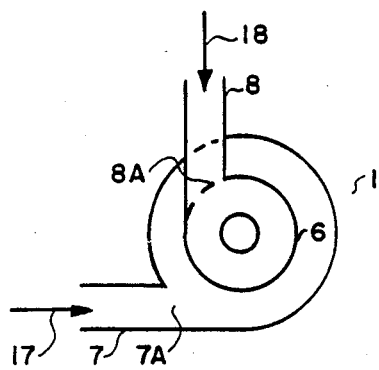
FIG. 1 is a top view schematic of the hydrocyclone, showing its major features.
Figure 2:
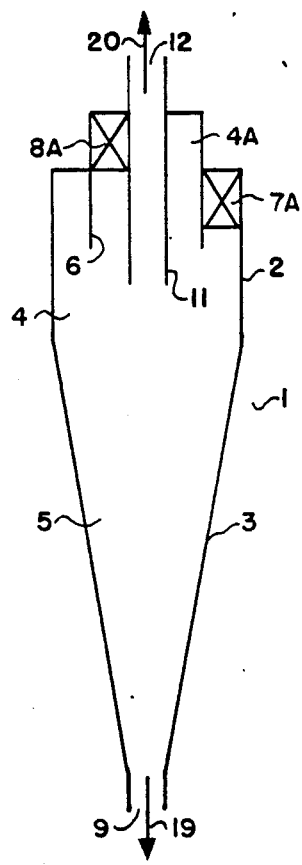
FIG. 2 is a vertical elevation of the schematic of FIG. 1.

FIGS. 1 and 2 illustrate the essential components of the novel hydrocyclone of the invention. The device comprises a body 1 having a cylindrical upper portion 2 and a frustoconical lower portion 3. Upper portion 2 defines upper region 4, and lower portion 3 defines lower region 5. A region 4A is in an axial relationship at least partially within region 4 and is defined by skirt baffle 6. Also situated axially within upper region 4 is vortex finder 11, which defines top outlet 12 at its upper extremity. Finally, upper region 4 is provided with an outer inlet 7 having an opening 7A, which is essentially tangential to the wall of cylindrical upper portion z so as to induce a cyclonic flow pattern in incoming stream 17. Inner inlet 8 in region 4A having opening 8A is essentially tangential to cylindrical skirt 6 so as to induce a cyclonic flow pattern in incoming stream 18. The inner inlet opening 8A is vertically separated from inlet opening 7A so that inlet 8 does not physically interfere with the flow of stream 17. As shown in FIGS. 1 and 2, inlet 8A is preferably positioned above inlet 7A. Extension of skirt baffle 6 below the lower extremity of inlet 7 effectively separates the streams 17 and 18 at the respective inlet openings so that intermixing of the streams does not occur until both streams are flowing cyclonically within upper region 4. Lower portion 3 terminates in the axially positioned bottom outlet 9.

Figure 3:
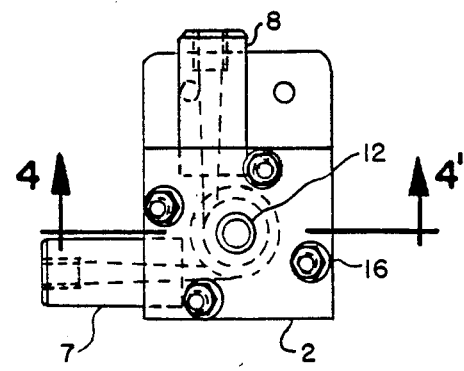
FIG. 3 is a top view of an embodiment of the hydrocyclone.
Figure 4:
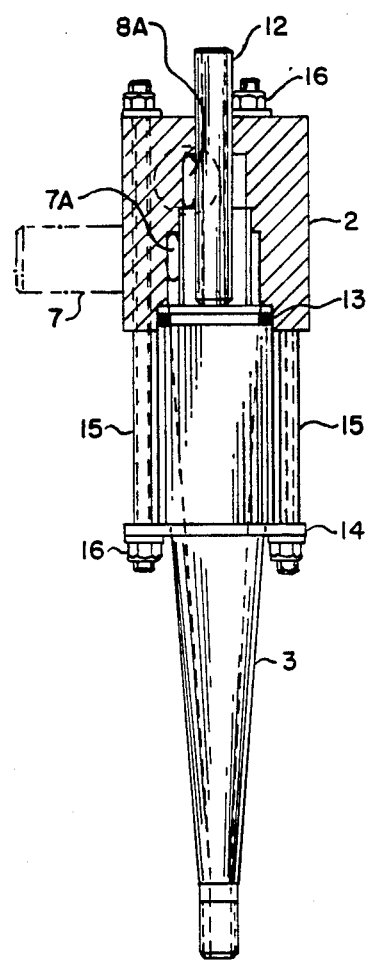
FIG. 4 is a vertical elevation, partly in cross-section along line 4—4' of FIG. 3.

FIGS. 3 and 4 illustrate in detail a preferred embodiment of the hydrocyclone described above in reference to FIGS. 1 and 2. Similar numerals identify similar components.

The preferred embodiment includes an O-ring gasket 13, which forms a seal between upper body portion 2 and lower body portion 3. The seal is constructed of rubber or some other deformable material conventionally used for sealing. Lower body portion 3 is provided with a mounting plate 14 for securing the body portions together in conjunction with threaded rods 15 and nuts 16. The rods pass through bores in the upper body portion 2 and are threaded into taps in the mounting plates. Nuts 16 below the plate cooperate with the tapped plate in a lock-nut arrangement. Inlets 7 and 8 are gradually tapered internally from a circular cross-sectional shape, adapted for fitting onto conventional round supply tubes, to a slotted cross-sectional shape at inlet openings 7A and 8A, respectively. The slotted configuration permits compactness of the upper regions 4 and 4A. It is important, however, to maintain a substantially uniform cross-sectional area throughout the inlets in order to maintain a laminar flow of inlet streams 17 and is at constant velocity.

As mentioned previously, the advantage of the inlet arrangement relates to the fact that streams 17 and 18 largely remain unmixed as they pass through the hydrocyclone. Due to the proximity of the inner inlet opening 8A to the vortex finder 11, a substantial portion of stream 18 will exit the hydrocyclone as stream 20 via top outlet 12 without mixing with stream 17. Likewise, stream 17, which enters the unit from outer inlet opening 8A, will substantially exit through bottom outlet 9 as stream 19 without mixing to any great extent with stream 18. Thus, if the two streams entering the device contain different concentrations of solute, then the two outlet streams will differ in concentration from each other such that the top outlet stream 20 will be closer in concentration to the inner inlet stream 18, and the bottom outlet stream 19 will be closer in concentration to the outer inlet stream 17.

The device's advantageous utility for washing suspended particles occurs because the particles are displaced laterally from one stream to the other due to the forces generated by the swirling flow pattern. Thus, with a proper choice of inlets for the unwashed slurry and the wash fluid, the suspended particles can be transported to the outlet with the lowest concentration of dissolved impurities in the fluid phase.

The direction of particle flow depends on the particle's specific gravity (density) relative to that of the fluid. To use the device to wash a suspension of buoyant particles, the feed comprising liquid with dissolved solids and the suspended buoyant particles is pumped through the outer inlet 7 as stream 17, and the wash fluid consisting of relatively pure liquid is pumped through the inner inlet 8 as stream 18. The buoyant particles will be displaced inwardly by centripedal force toward vortex finder 11 and will be emitted primarily through the top outlet 12 in fluid stream 20 having a lower solute concentration than stream 19 discharged from the bottom outlet 9. If the feed suspension comprises nonbouyant particles, it will be fed as stream 18 into inner inlet 8 and the wash stream will be fed into outer inlet 7. The particles, having a greater density than the fluid, will be displaced outwardly by centrifugal force toward the hydrocyclone body and will be emitted primarily through the bottom outlet 9 in solute-depleted stream 19.

Figure 5:
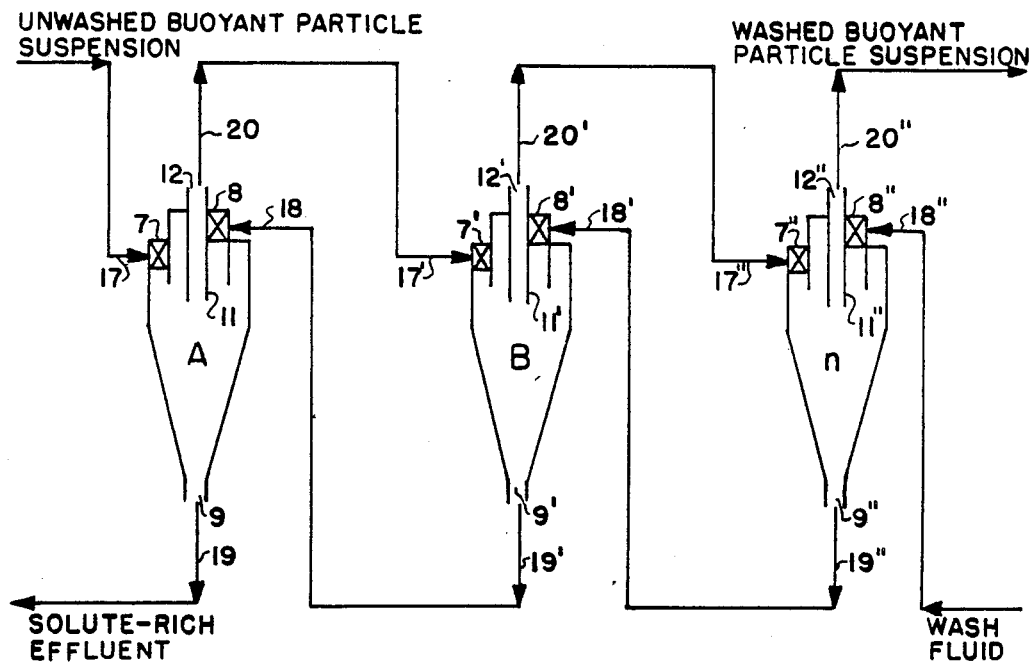
FIG. 5 is a schematic of a multistage countercurrent arrangement of hydrocyclones for washing suspensions of buoyant particles.

To achieve a greater degree of washing than can be obtained with one pass through the device, a counter-current arrangement of multiple units can be employed. Such a cascade of washing buoyant particles is illustrated in FIG. 5. The inlets and outlets of the cyclones in this figure are labeled consistently with FIGS. 1-4. The unwashed buoyant particle suspension is initially fed as stream 17 into outer inlet 7 of the first cyclone, A, in the series. A wash fluid, which is low in suspended and dissolved particle concentration relative to the suspension in stream 17, is fed into inner inlet 8 as stream 18. To the extent that stream is maintains its integrity within cyclone A, it tends to exit through outlet 12 because of its close proximity to vortex finder 11 relative to stream 17. The buoyant particles tend to migrate across the stream interface, from stream 17 to stream 18, and thereafter exit in suspension as stream 20. Outlet stream 20 is thereby enriched in buoyant particles relative to feed stream 18; and outlet stream 19 is depleted in buoyant particles relative to feed stream 18. In terms of nonbuoyant particles and dissolved solids, stream 19 is enriched relative to feed stream 17 by virtue of being depleted of a portion of the buoyant particles initially introduced into the cyclone. Stream 19 is taken off as a solute-rich effluent.

Stream 20, which contains partially washed particles, is fed as inlet stream 17' into the outer inlet 7' of cylone B, the next unit in the cascaded series. A wash fluid entering inner inlet 8' as 18' again tends to exit through vortex 11' and upper outlet 12' after depleting stream 17' of a portion of its suspended particles. Effluent stream 19' principally stems from stream 17', though it is depleted of the particles removed with stream 20'. Effluent stream 19' is, of course, the wash stream 18 for previous cyclone unit A. It thereby becomes readily apparent that streams 18, 20, 17', and 19' constitute a loop which serves to wash particles fed into cyclone A through inlet 17 and to transport them through the series of cyclones via the upper tier of outlets 20, 20', etc. The fluid flowing through this loop is a composite of solute-rich effluent and wash fluid resulting from a certain amount of unavoidable mixing of streams inside the cyclone. Of course, a gradient exists in the origin of the fluid make-up in the loops from one end of the cascade to the other. For example, the first loop 20, 17', 19', 18 will be relatively rich in solute-rich effluent, whereas the last loop will be relatively rich in wash fluid.

The respective streams of each succeeding cyclone operate as previously described. In the last cyclone of the series (shown here as cyclone n), fresh wash fluid is fed into inner inlet 8" via stream 18". Withdrawn from outlet 20" is the finally washed buoyant particle suspension. Insofar as the solute for this suspension is derived principally from the fresh wash fluid in stream 18", the recovered suspension is virtually depleted of any nonbuoyant particles or dissolved solids characteristic of feed stream 17.

One application of the above-described arrangement would be in desalination of seawater by freeze-concentration. In such a process, ice crystals, formed by freezing seawater, must be rinsed of all traces of brine before they can be melted to yield potable water. The initial slurry constitutes the unwashed suspension of buoyant particles (ice crystals) and the wash fluid fed into the inner inlet (18") of the last cyclone in the series would typically be fresh water. The solute-rich effluent removed from bottom outlet 19 of the first cyclone would be concentrated brine, and the washed ice crystals would be recovered from upper outlet 20" of the last unit.

Another application of the cascaded configuration shown in FIG. 5 is in the production of fruit juice concentrates by freeze-concentration. Because of the relatively high value of fruit juices, the loss of product by entrainment in the ice must be held to a minimum. It is therefore desirable to maximize the recovery of the liquid phase from the slurry of ice crystals. The slurry, formed by partially freezing the fruit juice, contains dissolved material including sugars and flavor components. It may also contain suspended pulp. The invention can be employed as described above to effect this separation and maintain high product recovery while minimizing dilution of the concentrate with excess wash water.

Figure 6:
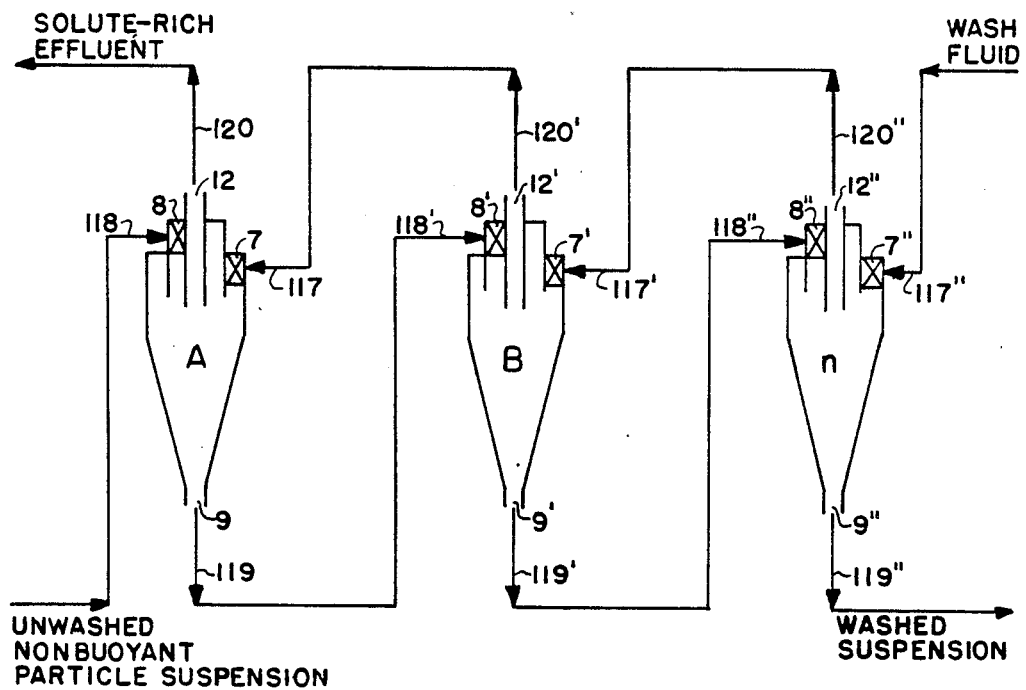
FIG. 6 is a schematic of a multistage countercurrent arrangement of hydrocyclones for washing suspensions of nonbuoyant particles.

In an alternate embodiment of the invention, the novel hydrocyclone may be used to wash nonbuoyant particles that have a specific gravity greater than the fluid phase. Referring to FIG. 6, the unwashed suspension of particles (stream 118) is pumped to the inner tangential inlet 8 in cyclone A and the wash fluid (stream 117") is pumped to outer tangential inlet 7" in cyclone n. The washed suspension of particles will pass successively through the bottom outlet of one cyclone to the inner inlet of the next succeeding cyclone, and will ultimately be recovered from bottom outlet 119" of the last cyclone, n. Meanwhile, solute-rich effluent, depleted of nonbuoyant particles and diluted with wash fluid, circulates in loops between each pair of adjacent cyclones analogous to the loops previously described for the embodiment of FIG. 5. The principles of the operation are the same as for the case when buoyant particles are washed, except the particles are displaced radially outward in the body of the cyclone instead of inward.

Some practical aspects of the countercurrent cyclone cascade arrangement are worth noting. First, it is necessary to pump at least one of the two streams that feed each cyclone unit. Second, it is desirable to have the flow rate of wash fluid greater than the flow rate of the liquid component of the particle suspension at each stage so that the maximum degree of washing may be obtained. This will require a control system to monitor and adjust flow rates. The liquid component of the washed particle suspension can be recovered to make up most of the wash fluid that is needed to supply the last cyclone in the cascade. For many applications, it is not necessary to completely separate all of the suspended particles in each cyclone stage, and a portion of the entering particles may be emitted with the solute-rich effluent. As long as the flow rate of particles discharged from each cyclone in the series is greater than the flow rate of particles entering the cyclone with the wash stream, there will be a net production of washed particles discharged from the cascade. In any of the embodiments described above, the wash fluid is usually the same as the solvent of the unwashed suspension.

The following examples are intended only to further illustrate the invention and are not intended to limit the scope of the invention which is defined by the claims.

EXAMPLE 1

The hydrocyclone illustrated in FIGS. 3 and 4 was used to wash buoyant ice crystals in an aqueous sodium chloride suspension. In the ensueing description, the referenced stream numbers correspond with those identified in FIG. 5. Data from this run is presented in Table I.

The unwashed ice particle suspension stream 17 was fed to the outer inlet 7 of the cyclone, and the wash fluid stream 18 containing a lower concentration of suspended ice particles as indicated in the Table was fed to the inner inlet 8.

TABLE I

| Stream Material | Stream Number | | | | |
| --- | --- | --- | --- | --- | --- |
| | 17 | 20 | 18 | 19 | Closure[a] |
| Ice Rate (lb/hr) | 290 | 310 | 180 | 130 | +8% |
| Liquid Rate (lb/hr) | 680 | 700 | 780 | 780 | −2% |
| Total Rate (lb/hr) | 970 | 1010 | 960 | 910 | +1% |
| Suspension Density (wt %) | 30 | 30 | 19 | 15 | — |
| Fluorescein Rate (units/hr) | 680 | 210 | 0 | 550 | −12% |
| Fluorescein Concentration | 1.00 | .30 | 0 | .71 | — |

[a]Represents the difference in material balance between all streams entering vs. all streams exiting the system.

The flow rates of liquid phases and suspended ice crystals in each stream were adjusted so that the flow rates of the outer feed stream 17 matched the flow rates of the overflow stream 20, and the flow rates of the inner feed stream 18 matched the flow rates of the underflow stream 19. Thus, the conditions of this test very closely approximate those that would be encountered in an individual unit of a washing cascade operating under steady-state conditions. To determine the degree of washing that was achieved, fluorescein dye was added to stream 17. The amount of liquid from stream 17 that appeared in either outlet stream could be determined by monitoring the fluorescein concentration in these streams using spectrophotometry. The results in Table I confirm that the liquid phase concentration in the overflow stream 20 of the cyclone is lower than that in the underflow stream 19. It is also evident that the flow rate of suspended particles in streams 17 and 20 is approximately double the flow rate of particles in streams 18 and 19, indicating that there is a net production of washed particles.

EXAMPLE 2

The principal advantage of the hydrocyclone of the present invention over a conventional cyclone is the enhanced separation efficiency at each stage, resulting in a reduction in the total number of washing stages. This enhanced efficiency for a multistage system is illustrated by the following hypothetical example based upon a projection of the results obtained in Example 1 for a single stage run to a multistage food product concentration process. The 43% dissolved solids concentration in the recovered product has been selected as a typical maximum solids concentration for a food product suspension which can be subjected to freeze-concentration.

Figure 7:
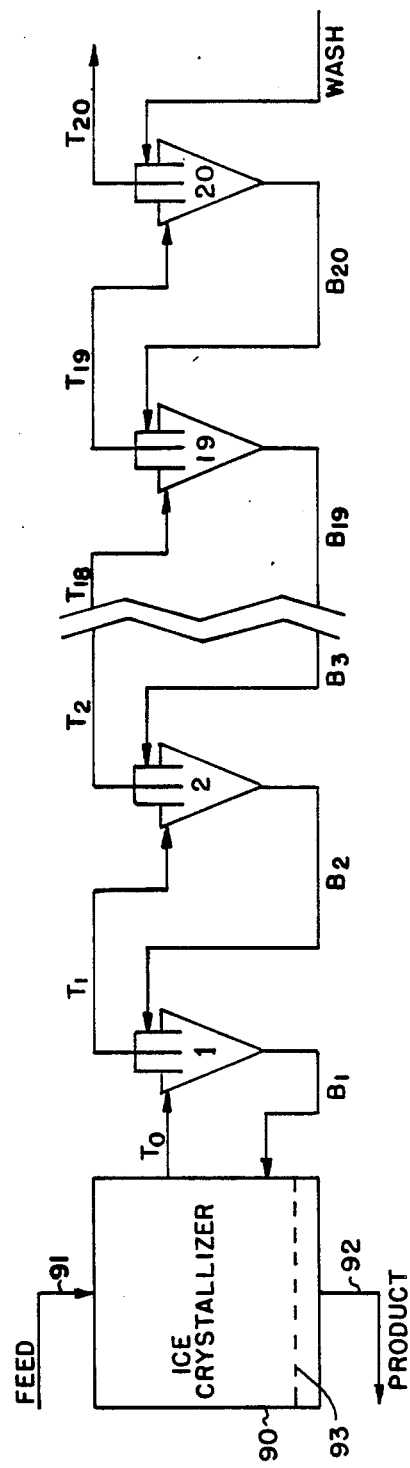
FIG. 7 is a schematic for a multistage countercurrent arrangement of hydrocyclones in line with a crystallizer.

Referring to FIG. 7, the process of this example employs an ice crystallizer 90 and a countercurrent cascade of 20 hydrocyclones of the type employed in Example 1. A feed stream 91 comprising 10% by weight dissolved solids is introduced into the crystallizer, and a product stream 92 is recovered. Screen 93 maintains separation between the ice slurry and the recovered product. The feed streams to the outer tangential inlets of cyclones 1–20 are identified as $T_0$ to $T_{19}$ respectively. The outlet streams from the top outlets of cyclones 1–20 are identified as $T_1$ to $T_{20}$ respectively, and the bottom outlet streams are $B_1$–$B_{20}$ respectively. The inner inlet streams for units 1–19 are $B_2$–$B_{20}$ with clean wash water being introduced into the inner inlet of unit 20. The liquid phase flow rate, liquid phase composition, and ice content of each stream is listed in Table II. The product concentration is 43%, with an overall recovery of 99%. Applying the same process to conventional hydrocyclones would require 45 stages for the same recovery. Thus, the number of wash stages in this hypothetical process was reduced by 56% through the use of the new hydrocyclone.

It is understood that the foregoing detailed description is given merely by way of illustration and that modification and variations may be made therein without departing from the spirit and scope of the invention.

TABLE II

| | Liquid Flowrate (lb/hr) | Dissolved Solids Concentrations (wt %) | Ice Concentration (wt %) |
| --- | --- | --- | --- |
| Feed | 100 | 10 | 0 |
| Product | 25 | 43 | 0 |
| $T_0$ | 4590 | 43 | 30 |
| $B_1$ | 5510 | 36 | 15 |
| $T_1$ | 4590 | 29 | 30 |
| $B_2$ | 510 | 24 | 15 |
| $T_2$ | 4590 | 19 | 30 |
| $B_3$ | 5510 | 16 | 15 |
| $T_3$ | 4590 | 13 | 30 |
| $B_4$ | 5510 | 11 | 15 |
| $T_4$ | 4590 | 8.6 | 30 |
| $B_5$ | 5510 | 7.1 | 15 |
| $T_5$ | 4590 | 5.7 | 30 |
| $B_6$ | 5510 | 4.8 | 15 |
| $T_6$ | 4590 | 3.8 | 30 |
| $B_7$ | 5510 | 3.2 | 15 |
| $T_7$ | 4590 | 2.5 | 30 |
| $B_8$ | 5510 | 2.1 | 15 |
| $T_8$ | 4590 | 1.6 | 30 |
| $B_9$ | 5510 | 1.4 | 15 |
| $T_9$ | 4590 | 1.1 | 30 |
| $B_{10}$ | 5510 | .93 | 15 |
| $T_{10}$ | 4590 | .74 | 30 |
| $B_{11}$ | 5510 | .61 | 15 |
| $T_{11}$ | 4590 | .49 | 30 |
| $B_{12}$ | 5510 | .40 | 15 |
| $T_{12}$ | 4590 | .32 | 30 |
| $B_{13}$ | 5510 | .27 | 15 |
| $T_{13}$ | 4590 | .21 | 30 |
| $B_{14}$ | 5510 | .17 | 15 |
| $T_{14}$ | 4590 | .14 | 30 |
| $B_{15}$ | 5510 | .11 | 15 |
| $T_{15}$ | 4590 | .088 | 30 |
| $B_{16}$ | 5510 | .072 | 15 |
| $T_{16}$ | 4590 | .055 | 30 |
| $B_{17}$ | 5510 | .044 | 15 |
| $T_{17}$ | 4590 | .033 | 30 |
| $B_{18}$ | 5510 | .026 | 15 |
| $T_{18}$ | 4590 | .018 | 30 |
| $B_{19}$ | 5510 | .014 | 15 |
| $T_{19}$ | 4590 | .0087 | 30 |
| $B_{20}$ | 5510 | .0054 | 15 |
| $T_{20}$ | 4590 | .0022 | 20 |
| Wash | 5510 | 0 | 0 |

We claim:

1. A hydrocyclone comprising a body having a cylindrical upper portion defining an upper region and a frustoconical lower portion defining a lower region, an axially-oriented bottom outlet at the apex of the lower body portion, an axially-oriented vortex finder and top outlet within the upper region, a vertically extending cylindrical skirt baffle having a lower extension terminating within said upper region and separating said upper region into an interior zone radially surrounding the vortex finder and an exterior zone radially surrounding the interior zone, a first inlet to the exterior zone of said upper region substantially tangential to the upper body portion, and a second inlet to the interior zone of said upper region substantially tangential to the skirt baffle, where said first and second inlets are radially separated from one another by the skirt baffle and wherein said first and second inlets are vertically spaced from one another.

2. A hydrocyclone as described in claim 1 wherein the vortex finder has a lower edge positioned at a level below both the first and second inlets.

3. An apparatus for separating and washing particulate solids from a liquid suspension wherein said particles have a specific gravity less than said liquid, said apparatus comprising a series of hydrocylones as described in claim 1, wherein the first hydrocyclone of the series is adapted to receive the liquid suspension into the first inlet and discharge an effluent with at least a portion of the particles removed through the bottom outlet, wherein the last hydrocyclone of the series is adapted to receive a wash fluid into the second inlet and discharge washed particulate solids from the top outlet, wherein the top outlet of each of the hydrocyclones in the series other than said last hydrocyclone is in fluid communication with the first inlet of the next succeeding hydrocyclone in the series, and wherein the bottom outlet of each of the hydrocyclones in the series other than said first hydrocyclone is in fluid communication with the second inlet of the next preceding hydrocyclone in the series.

4. An apparatus for separating and washing particulate solids from a liquid suspension wherein said particles have a specific gravity greater than said liquid, said apparatus comprising a series of hydrocyclones as described in claim 1, wherein the first hydrocyclone of the series is adapted to receive the liquid suspension into the second inlet and discharge an effluent with at least a portion of the particles removed through the top outlet, wherein the last hydrocyclone of the series is adapted to receive a wash fluid into the first inlet and discharge washed particulate solids from the bottom outlet, wherein the top outlet of each of the hydrocyclones in the series other than said first hydrocyclone is in fluid communication with the first inlet of the next preceding hydrocyclone in the series, and wherein the bottom outlet of each of the hydrocyclone in the series other than said last hydrocyclone is in fluid communication with the second inlet of the next succeeding hydrocyclone in the series.

5. A process for separating and washing particulate solids from a liquid suspension wherein said particles have a specific gravity less than said liquid, said process being conducted in a hydrocyclone comprising a body having a cylindrical upper portion defining an upper region and a frustoconical lower portion defining a lower region, an axially oriented bottom outlet at the apex of the lower body portion, an axially oriented vortex finder and top outlet within the upper region, a vertically extending cylindrical skirt baffle having a lower extension terminating within said upper region and separating said upper region into an interior zone radially surrounding the vortex finder and an exterior zone radially surrounding the interior zone, a first inlet to the exterior zone of said upper region substantially tangential to the upper body portion, and a second inlet to the interior zone of said upper region substantially tangential to the skirt baffle, wherein said first and second inlets are radially separated from one another by the skirt baffle and wherein said first and second inlets are vertically spaced from one another, said process comprising:

a. introducing said liquid suspension into the first inlet;

b. introducing into the second inlet a wash fluid having a content of said particulate solids less than the particulate solids content of the liquid suspension;

c. withdrawing from the bottom outlet an effluent having at least a portion of the particulate solids removed; and d. withdrawing washed particles from the top outlet.

6. The process as described in claim 5 wherein said liquid suspension is a food product and said solid particles are ice crystals.

7. The process of claim 5 wherein said hydrocyclone is the first of a cascading series of similar hydrocyclones wherein the washed particle suspension is recovered from the top outlet and fresh wash fluid is fed into the second inlet of the last hydrocyclone of the series, the washed particles from the top outlet of the first hydrocyclone and all intermediate hydrocyclones are fed into the first inlet of the next succeeding hydrocyclone, and the solid particle-depleted effluent from the bottom outlet of each of the second through the last hydrocyclone in the series is fed into the second inlet of the next preceding hydrocyclone.

8. A process as described in claim 7 wherein said liquid suspension is a food product and said solid particles are ice crystals.

9. A process for separating and washing particulate solids from a liquid suspension wherein said particles have a specific gravity greater than said liquid, said process being conducted in a hydrocyclone comprising a body having a cylindrical upper portion defining an upper region and a frustoconical lower portion defining a lower region, an axially oriented bottom outlet at the apex of the lower body portion, an axially oriented vortex finder and top outlet within the upper region, a vertically extending cylindrical skirt baffle having a lower extension terminating within said upper region and separating said upper region into an interior zone radially surrounding the vortex finder and an exterior zone radially surrounding the interior zone, a first inlet to the exterior zone of said upper region substantially tangential to the upper body portion, and a second inlet to the interior zone of said upper region substantially tangential to the skirt baffle, wherein said first and second inlets are radially separated from one another by the skirt baffle and wherein said first and second inlets are vertically spaced from one another, said process comprising:

a. introducing said liquid suspension into the second inlet;

b. introducing into the first inlet a wash fluid having a content of said particulate solids less than the particulate solids content of the liquid suspension;

c. withdrawing from the top outlet an effluent having at least a portion of the particulate solids removed; and d. withdrawing washed particles from the bottom outlet.

10. The process of claim 9 wherein said hydrocyclone is the first of a cascading series of similar hydrocyclones wherein the washed particle suspension is recovered from the bottom outlet and fresh wash fluid is fed into the first inlet of the last hydrocyclone of the series, the washed particles from the bottom outlet of the first hydrocyclone and all intermediate hydrocyclones are fed into the second inlet of the next succeeding hydrocyclone, and the solid particle-depleted effluent from the top outlet of each of the second through the last hydrocyclone in the series is fed into the first inlet of the next preceding hydrocyclone.

* * * * *